United States Patent
Brand

(10) Patent No.: US 9,517,842 B2
(45) Date of Patent: Dec. 13, 2016

(54) FILTERS FOR AIRCRAFT ENGINE INLETS

(71) Applicant: Bell Helicopter Textron Inc., Fort Worth, TX (US)

(72) Inventor: Albert G. Brand, N. Richlands Hills, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 113 days.

(21) Appl. No.: 14/292,248

(22) Filed: May 30, 2014

(65) Prior Publication Data

US 2015/0344141 A1    Dec. 3, 2015

(51) Int. Cl.
*B64D 33/02* (2006.01)
*F02C 7/055* (2006.01)

(52) U.S. Cl.
CPC ............... *B64D 33/02* (2013.01); *F02C 7/055* (2013.01); *B64D 2033/0246* (2013.01); *Y02T 50/672* (2013.01)

(58) Field of Classification Search
CPC .. B64D 33/02; B64D 2033/0246; F02C 7/055; F02C 7/052
See application file for complete search history.

(56) References Cited

U.S. PATENT DOCUMENTS

| | | | |
|---|---|---|---|
| 3,483,676 A * | 12/1969 | Sargisson | B64D 33/02 55/306 |
| 7,192,462 B2 | 3/2007 | Stelzer et al. | |
| 8,361,209 B2 * | 1/2013 | Colaprisco | B01D 46/12 55/422 |
| 2009/0261208 A1 | 10/2009 | Belyew | |
| 2010/0043761 A1 * | 2/2010 | Joergl | F02B 29/0475 123/563 |
| 2014/0077039 A1 * | 3/2014 | Scimone | B64D 15/12 244/23 B |

* cited by examiner

*Primary Examiner* — Valentina Xavier

(57) ABSTRACT

Some examples of an aircraft engine barrier filtration system include an engine barrier filter layer positioned near an aircraft engine intake. The filter layer filters aircraft engine intake air. The system includes a check valve assembly positioned adjacent to the engine barrier filter layer. The check valve assembly permits the engine intake air to flow into the engine through the filter layer during a first aircraft operation mode and to prevent air flow away from the engine through the filter layer during a second aircraft operation mode that is different from the first aircraft operation mode.

18 Claims, 6 Drawing Sheets

FILTERS FOR AIRCRAFT ENGINE INLETS

TECHNICAL FIELD

This disclosure relates to air filtration systems in aircraft.

BACKGROUND

Engines for propulsion systems, e.g., aircraft intake air for operation. The air needs to be contaminant-free for efficient engine operation, e.g., internal combustion. Moreover, contamination of intake air can cause internal damage, e.g., premature wear on engine components resulting in increased maintenance costs and decreased operational reliability. When aircraft operate at low altitudes or idle on the ground, or in icing conditions, the engine can be exposed to contaminants. A filtration system can be placed at an engine inlet to filter the intake air. The filtration system can eliminate contaminants by providing substantially contaminant-free air for engine intake.

SUMMARY

This disclosure describes filters for aircraft engine inlets, e.g., a passive, one way filtration device that prevents back-flow of the filter.

Certain aspects of the subject matter described here can be implemented as an aircraft engine barrier filtration system. The system includes an engine barrier filter layer positioned near an aircraft engine intake. The filter layer filters aircraft engine intake air. The system includes a check valve assembly positioned adjacent to the engine barrier filter layer. The check valve assembly permits the engine intake air to flow into the engine through the filter layer during a first aircraft operation mode and to prevent air flow away from the engine through the filter layer during a second aircraft operation mode that is different from the first aircraft operation mode.

This, and other aspects, can include one or more of the following features. The check valve assembly can be positioned between the aircraft engine and the filter layer. The first aircraft operation mode can be either a hover mode or an idling mode. The second aircraft operation mode can be a flight mode. The check valve assembly can include a first layer including multiple openings, and a second layer attached to the first layer. The second layer can include multiple reeds, each reed aligning with a corresponding opening of the multiple openings. The first layer can be formed from a flexible material or a rigid material that is hinged. The multiple openings and the multiple reeds can be rectangular. A surface area of a reed can be greater than a surface area of an opening with which the reed is aligned. The filter layer can be positioned between the aircraft engine and the check valve assembly. The check valve assembly can be arranged in corrugated layers. The check valve assembly can be adjacent to the filter layer. The check valve assembly can cover less than an entirety of the filter layer.

Certain aspects of the subject matter described here can be implemented as an aircraft engine barrier filtration system. The system includes an engine barrier filter layer positioned near an aircraft engine intake. The filter layer filters aircraft engine intake air. The system includes a one-way check valve assembly attached to the engine barrier filter layer. The check valve assembly permits the engine intake air to flow into the engine through the filter or to prevent air flow away from the engine and the opening of the engine main inlet door based, in part, on an aircraft operation mode.

This, and other aspects, can include one or more of the following features. The check valve assembly can be configured to permit the engine intake air to flow into the engine when the aircraft operation mode is either a hover mode or an idling mode. The check valve assembly can be configured to prevent air flow away from the engine when the aircraft operation mode is a flight mode. The check valve assembly can include a first layer including multiple openings, and a second layer attached to the first layer. The second layer can include multiple reeds, each reed aligning with a corresponding opening of the multiple openings. A surface area of a reed can be greater than a surface area of an opening with which the reed is aligned. The filter layer can be positioned between the aircraft engine and the check valve assembly. The check valve assembly can be positioned between the aircraft engine and the check valve assembly.

Certain aspects of the subject matter described here can be implemented as a method of providing intake air to an aircraft engine. The method includes permitting flow of aircraft engine intake air into an aircraft engine through an engine barrier filter layer during a first aircraft operation mode. The method includes preventing flow of air away from the engine through the engine barrier filter layer during a second aircraft operation mode that is different from the first aircraft operation mode.

This, and other aspects, can include one or more of the following features. The first aircraft operation mode can be either a hover mode or an idling mode. The second aircraft operation mode can be a flight mode.

Certain aspects of the subject matter described here can be implemented as a means for providing intake air to an aircraft engine. The means can include means for permitting flow of aircraft engine intake air into an aircraft engine through an engine barrier filter layer during a first aircraft operation mode. The means can include means for preventing flow of air away from the engine through the engine barrier filter layer during a second aircraft operation mode that is different from the first aircraft operation mode.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a one way filter for use with an aircraft engine. In some aircraft, a barrier filtration system can be positioned at the engine inlet to filter contaminants from the intake air. When the aircraft is operating over an unprepared area (i.e., an area in which the air includes contaminants), the barrier filtration system prevents contaminants from entering the aircraft engine. When the aircraft exits the conditions of contaminated air, the barrier filtration system is no longer needed. Instead, the aircraft can go to high forward speed and take advantage of an open-face inlet that develops ram air pressure inside the inlet for better engine performance. In such situations, ram air pressure can only develop if the surrounding walls of the inlet are solid. If the surrounding inlet walls consist of an untreated filter, the ram air pressure would cause air to back flow through the barrier filtration system resulting in less engine performance and increased drag due to low velocity air that is escaping the inlet through the filter. That is, the air which has entered the engine inlet for purposes of combustion can leak out through the filters due to back-flow, resulting in momentum drag and flow separation that degrade the aircraft speed and range.

This disclosure describes a modification to the aircraft engine barrier filtration system that prevents backflow through the filter and allows the inlet to develop ram pressure for the engine and avoids momentum drag losses associated with filter outflow. A one-way filtration system permits the aircraft engine to utilize filtered air when the environment contains debris or other contaminants. In this condition, a bypass door (valve) will close the engine air intake so that it is forced to pass through a filter. When the aircraft leaves the contaminated environment, the bypass door opens so that the inlet can take unfiltered air (for better performance). The invention proposes a method to prevent the filter from back-flowing when unfiltered air is desired. The invention permits the inlet to build up aerodynamic ram pressure for improved engine performance and, by eliminating back-flow, the invention reduces momentum drag for air that would otherwise pass through the filter in a direction that results in flow leaving the inlet through the filter walls where excess drag can result. The backflow prevention system can be implemented as a substantially passive system, i.e., one that requires few (or no) control mechanisms to operate the system.

Figure 1A:
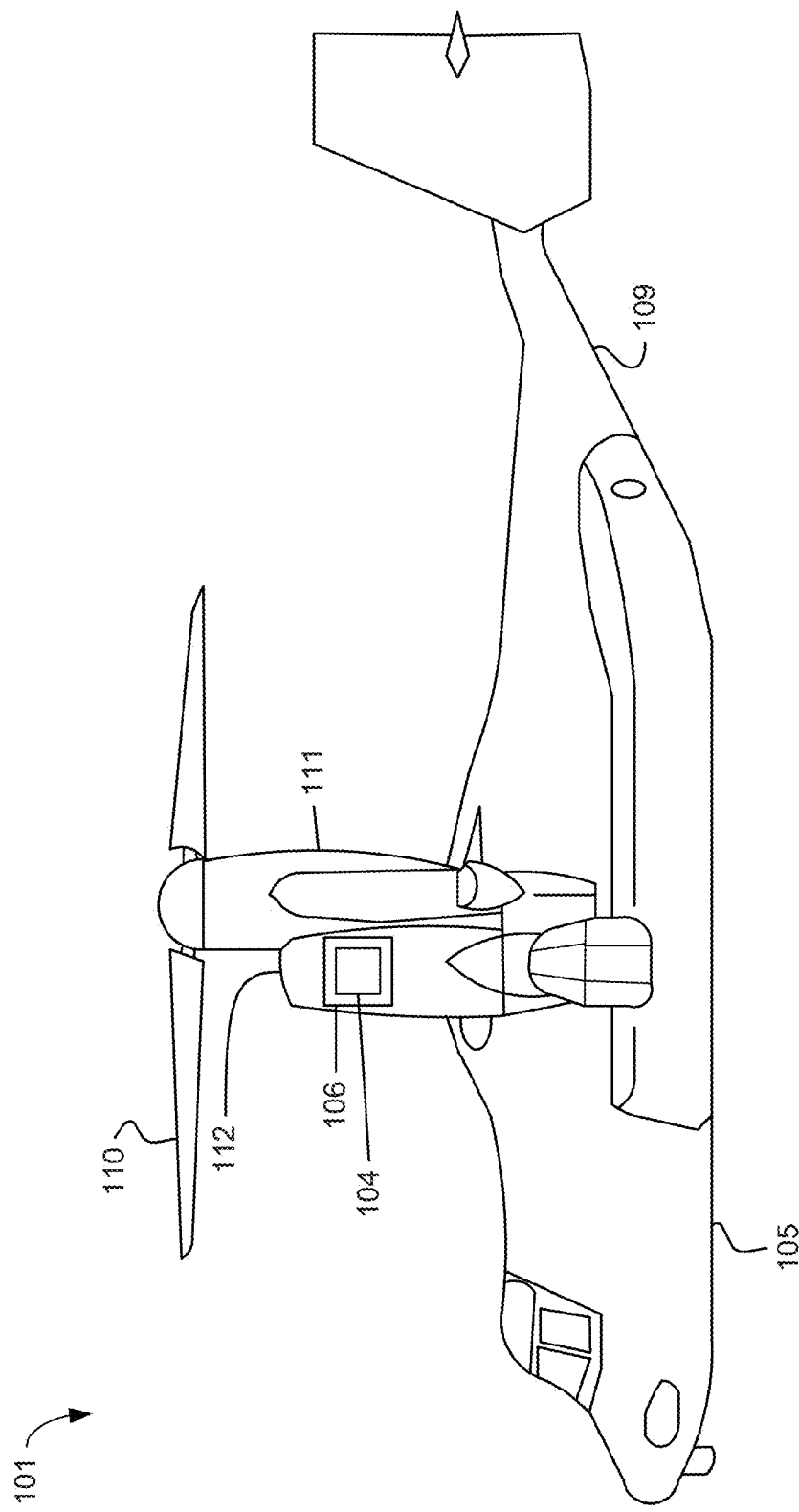
FIG. 1A is a schematic diagram of a side view of a tilt rotor aircraft in a low speed mode of operation.
Figure 1B:
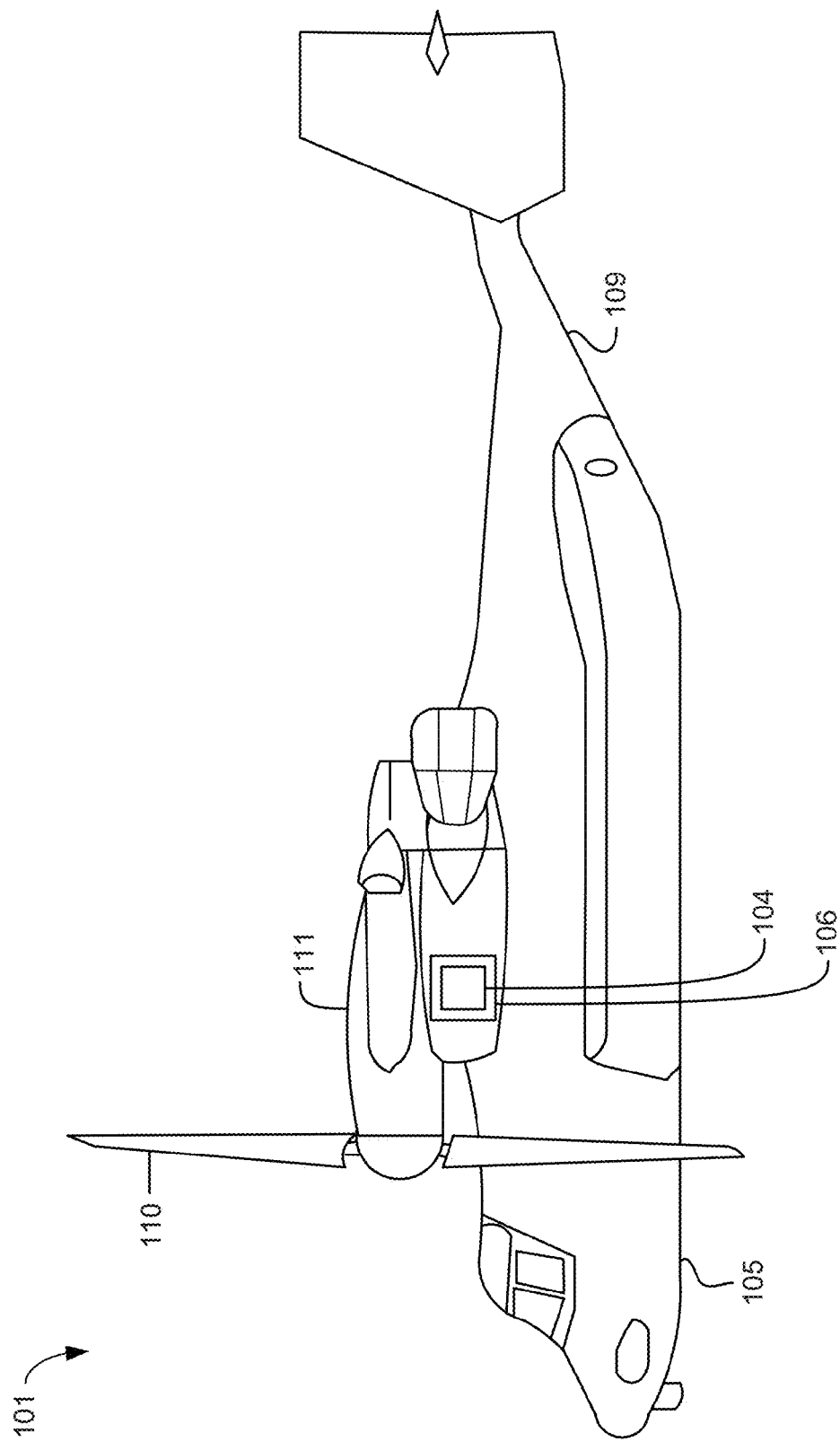
FIG. 1B is a schematic diagram of a side view of the tilt rotor aircraft in a high speed mode of operation.

FIG. 1A is a schematic diagram of a side view of a tilt rotor aircraft in a low speed mode of operation. FIG. 1B is a schematic, side view diagram of the tilt rotor aircraft in a high speed mode of operation. FIG. 1A shows an example tilt rotor aircraft 101 including a fuselage 105, a nacelle 111 and rotor 110. Rotatable nacelles 111 are coupled to each end portion of the wing. The nacelles are configured with two possible inlets for engine combustion air. In FIG. 1A, the main inlet 102 is closed by a door mechanism (not shown) and engine combustion air must enter the nacelle via a side opening that is fitted with an engine barrier filter layer 104. In this manner, the low-speed aircraft can enter a dust cloud without harming the engine due to the surrounding contaminants. When the aircraft exits the dust cloud, the barrier filtration is no longer necessary. The main inlet door can open to allow unfiltered air to enter the nacelle 111 for engine combustion. When the aircraft transitions to high speed mode (FIG. 1B) and with the main inlet in the open position, an untreated barrier filter would allow excess air to enter the main inlet and leak through the untreated barrier filter layer 104. The leakage of excess air can be significant in certain flight regimes and would cause additional aircraft drag and a reduction in airspeed for the same power.

The treated engine barrier filtration system includes the engine barrier filter layer 104 and a check valve assembly 106. The check valves are reed-type assemblies that can be attached to either side of the barrier filter. If placed on the inside of the nacelle, the check valves can lie flat against the barrier filter. If an external attachment is desired, a corrugated arrangement or a spacer will permit the reed valves to remain outside of the nacelle. Since reed valves can only support a unidirectional flow, the filter becomes a one-way filter. Air can enter the nacelle through the treated filter when engine suction prevails. However, air cannot leak out of the nacelle (through the treated barrier filter) when high pressures are delivered to the engine in high speed mode with the main inlet door open.

Figure 2B:
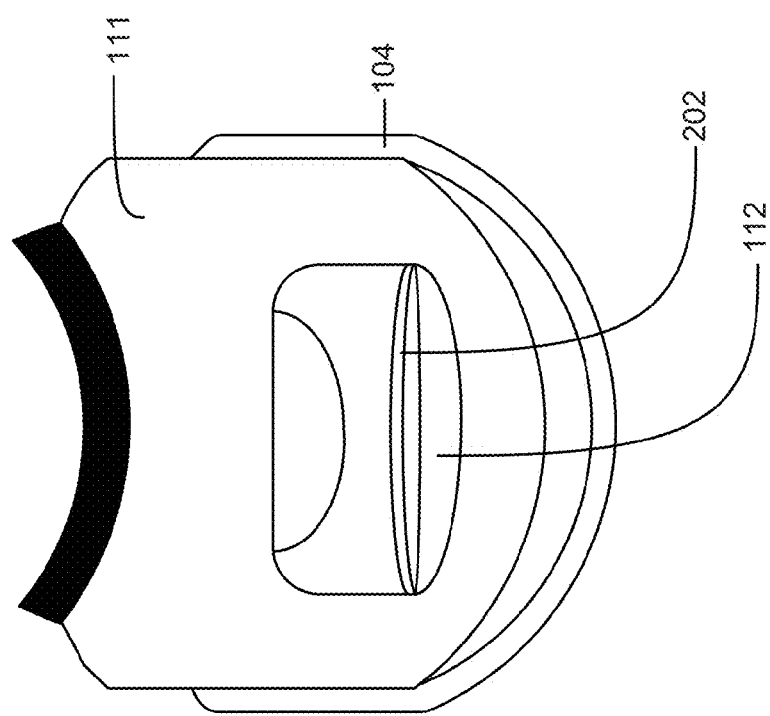
FIG. 2B is a schematic diagram of a front view of the nacelle of the tilt rotor aircraft including the aircraft engine barrier filtration system.
Figure 2A:
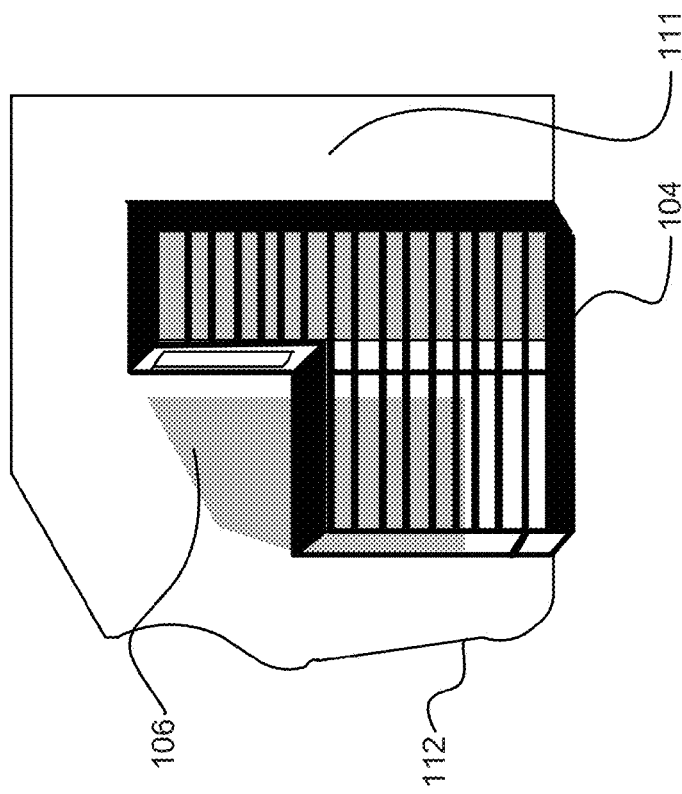
FIG. 2A is a schematic diagram of a side view of a nacelle of the tilt rotor aircraft including an aircraft engine barrier filtration system.

FIG. 2A is a schematic diagram of a side view of a nacelle 111 of the tilt rotor aircraft 101 including an aircraft engine barrier filtration system. FIG. 2B is a front view schematic diagram of the nacelle 111 of the tilt rotor aircraft, showing the inlet 112, and the main inlet door 202, used to divert engine combustion air through the engine barrier filtration system. The main inlet door 202 is shown in the open position, which would allow unfiltered air to enter the engine for combustion. When the door 202 is moved to the closed position, combustion air must enter through the filter layers 104.

When the aircraft 101 is operated in a first aircraft operation mode with the nacelles 111 in a vertical orientation (e.g., a low speed mode, a hover mode, a helicopter mode, or idling on the ground), the door 202 on the engine intake inlet 112 can be closed to force combustion air to pass through the filter layers 104. The aircraft operation mode can change from the first mode to a second aircraft operation mode in which the nacelles 111 are in a horizontal orientation (e.g., a high speed mode, a flight mode or a cruise mode). The door 202 on the engine intake inlet 112 can be opened or closed in this mode. However, if the main inlet door 202 is open in a high speed flight mode, the incoming air can develop sufficient ram pressure to cause back-flow of air through untreated filters. By treating the filter layers 104 with the check valve assembly 106, back-flow of air is prevented, and the inlet can develop positive pressure for improved engine performance.

Figure 3B:
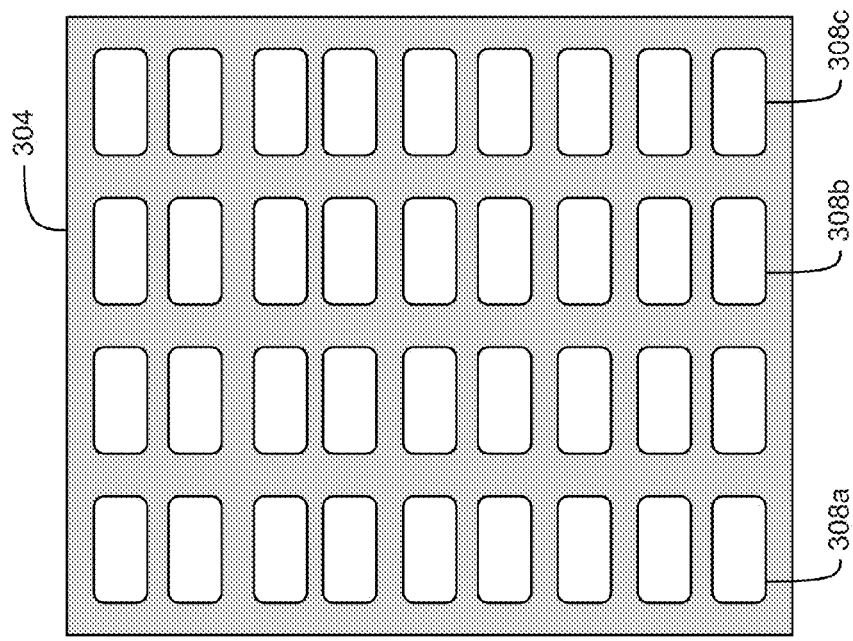
FIGS. 3A and 3B are schematic diagrams of a check valve assembly included in the aircraft engine barrier filtration system.
Figure 3A:
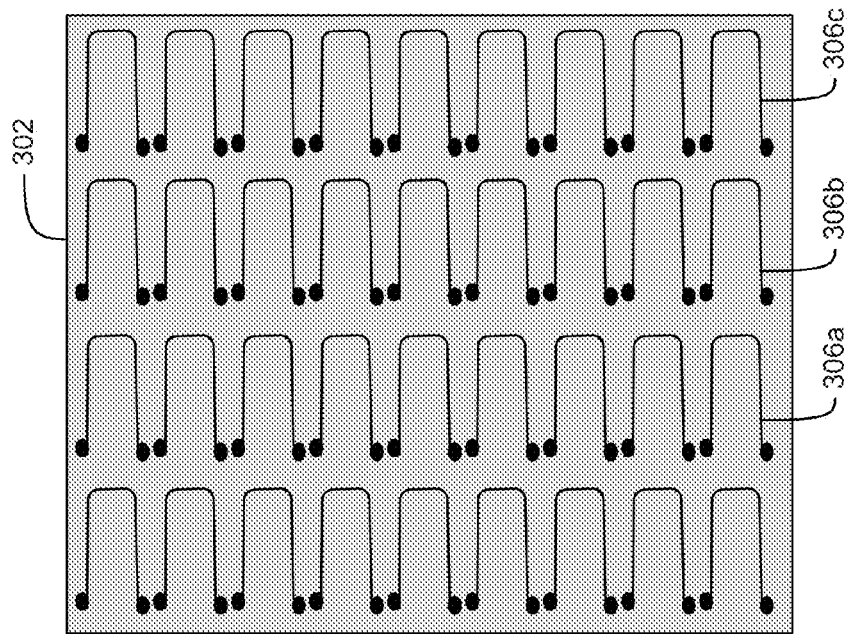

FIGS. 3A and 3B are schematic diagrams of a check valve assembly 106 included in the treated aircraft engine barrier filtration system. The check valve assembly 106 includes a first layer 304 with multiple openings (e.g., a first opening 308a, a second opening 308b, a third opening 308c, and other openings) that have been formed in the first layer 304. The check valve assembly 106 includes a second layer 302 with multiple reeds (e.g., a first reed 306c, a second reed 306b, a third reed 306a). The reeds are slightly oversized relative to the openings in the first layer so that closure is achieved against the holes in layer 304. The first layer 304 is attached (e.g., bonded or otherwise attached) to the second layer 302 such that each reed aligns with the corresponding opening in such a way as to permit flow in one direction only. The first layer 304 can be formed a metal, a composite material, or any material that has sufficient strength, flexibility, and temperature resistance to operate under the conditions in which the aircraft 101 operates. The multiple reeds on the second layer 302 can be formed using a material (e.g., a composite material) that can flex. For example, the multiple reeds can be formed of a flexible material or a rigid material that is hinged. The reed valve assembly can be placed outside of the inlet as show in FIGS. 2A and 2B by providing clearance between the filter and the valves. Alternatively, the reed valve assembly can be placed flush on the filter surface if the reed valve assembly is installed inside the inlet. In either configuration, the reed valves can allow air into the engine inlet while preventing air from leaking out of the engine inlet.

In some implementations, each reed can have a rectangular cross-section, one edge of which is attached to the second layer 302 while the remaining three edges are unattached to the second layer 302 allowing the reed to flap about the attached edge. In such implementations, each opening can also have a rectangular cross-section. A surface area of a reed (e.g., a portion of the reed that can flap) is slightly greater than a surface area of the associated opening with which the reed is aligned. This construction provides the one-way operation that is common to reed valves. In some implementations, each reed and/or each opening with which each reed aligns can have a cross-section other than a rectangular cross-section with a surface area of the reed being greater than a surface area of a corresponding opening with which the reed aligns. The number of openings and reeds in the check valve assembly 106 can be variable depending, in part, on a surface area of the filter layer 104 to which the check valve assembly 106 is attached.

Figure 4B:
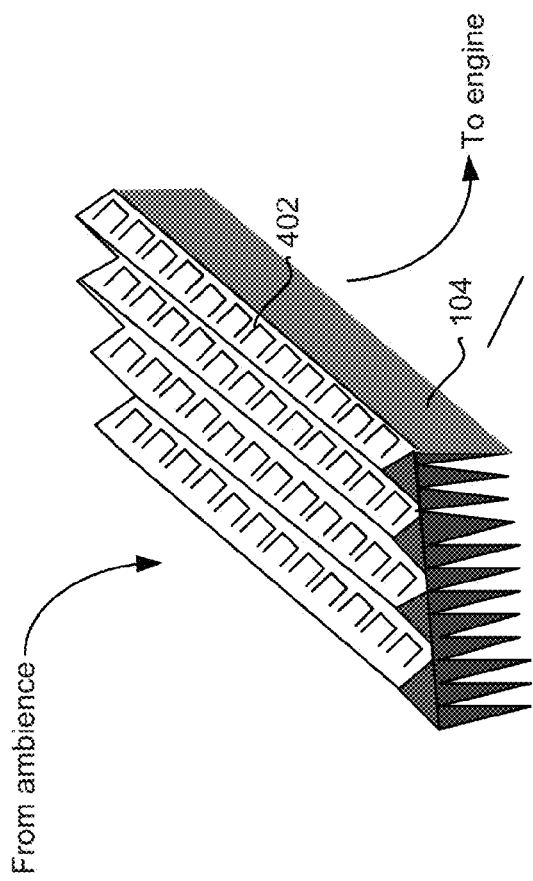
FIG. 4B is a schematic diagram of perspective view of a second arrangement of the aircraft engine barrier filtration system relative to the aircraft engine.
Figure 4A:
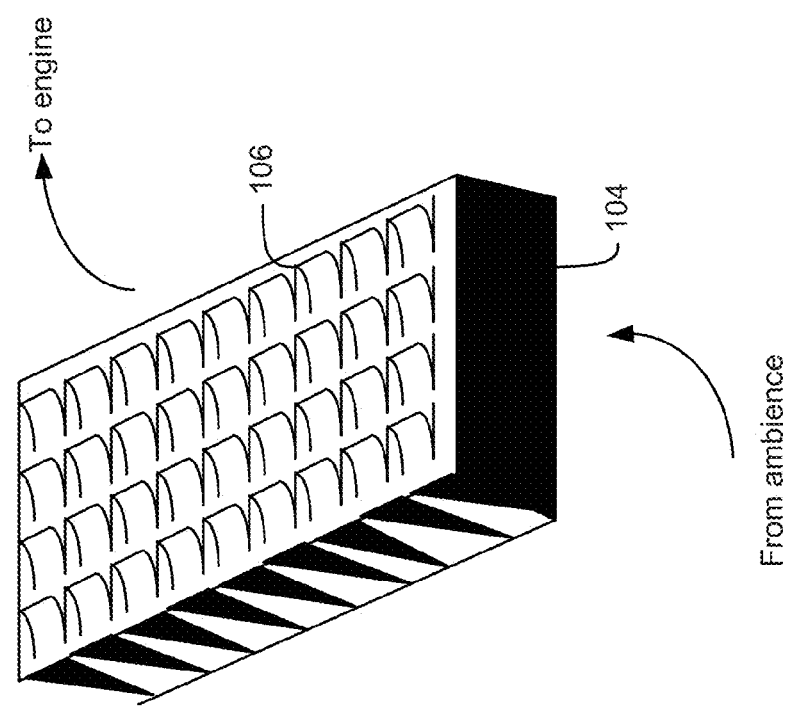
FIG. 4A is a schematic diagram of a perspective view of a first arrangement of the aircraft engine barrier filtration system relative to the aircraft engine.

FIG. 4A is a schematic diagram of a side view of a first arrangement of the aircraft engine barrier filtration system relative to the aircraft engine. In the arrangement shown in FIG. 4A, the filter layer 104 is positioned between the engine 102 and the check valve assembly 106. The second layer 302 is positioned between the first layer 304 and the filter layer 104. During a first aircraft operation mode (e.g., a low speed mode, a hover mode, a helicopter mode, or idling), the door to the engine intake 112 is closed. The engine 102 sucks ambient air through the filter layer 104 and check valve assembly 106. The air passes through the multiple openings in the first layer 304 causing the multiple reeds in the second layer 302 to flap inward (i.e., toward the engine 102). The air then passes through the filter layer 102 that filters the contaminants out of the air. The filtered air then passes into the engine 102. During a second aircraft operation mode (e.g., a high speed mode, a flight mode or a cruise mode), the door to the engine intake 112 is opened. Air entering the nacelle inlet can developed sufficient RAM pressure causing the reed valves 302 to close against the backing surface 304. The closing of the reed valves prevents air from back-flowing through the filter and causing momentum drag. With RAM pressure developed inside the nacelle, air is directed toward the engine intake inlet 112, resulting in improved engine performance.

FIG. 4B is a schematic diagram, perspective view, of a second arrangement of the aircraft engine barrier filtration one-way valve system. In the arrangement shown in FIG. 4B, the check valve assembly 106 is positioned outside of the nacelle so that the filter layer 104 is closest to the engine. The reed valves 402 are arranged in a corrugated pattern (outside the filter) that allows the reed valves to open toward the filter without contacting the filter. An external arrangement of reed valves such as shown the one illustrated in FIG. 4B may be preferred if operation of the reed valves could result in reed valves breaking loose and becoming ingested by the engine. During a first aircraft operation mode (e.g., a hover mode, a helicopter mode, or idling), the door to the engine intake 112 is closed. The engine 102 sucks ambient air through the reed valve assembly 402 and then passes the air through the filter 104 which extracts the contaminants out of the air. During a second aircraft operation mode (e.g., a flight mode or a cruise mode), the door to the engine intake 112 is opened. The incoming air has developed sufficient RAM pressure causing the reed valves 402 to close against the backing surface. The closing of the reed valves prevents air from back-flowing through the filter and causing momentum drag. Instead, the back-flowing air is directed toward the engine intake inlet 112, resulting in improved engine performance.

Figure 5:
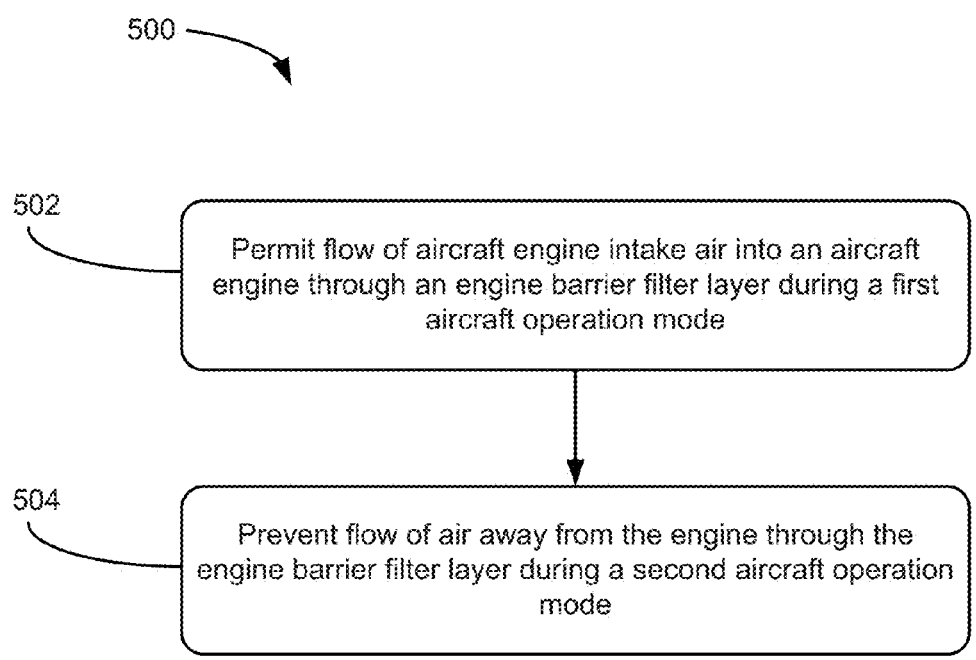
FIG. 5 is a flowchart of an example process for providing intake air to an aircraft engine.

FIG. 5 is a flowchart of an example process 500 for providing intake air to an aircraft engine 102. The process 500 can be implemented using an aircraft engine barrier filtration and reed valve system such as that described above. At 504, when the aircraft is being operated in high speed mode with the inlet door open, a one-way check valve assembly (attached to the engine barrier filter layer) will permit the engine airflow to develop positive (ram) pressure inside the inlet. No backflow of the filters will occur because the reed valves prevent reversed flow. At 502, flow of aircraft engine intake air into an aircraft engine through an engine barrier filter layer occurs during another aircraft operation mode that requires filtered air. For example, when the aircraft is in either a hover mode, helicopter mode, or idling mode with dust particles in the air, the aircraft pilot can close the engine intake door, forcing engine intake air to pass through the aircraft engine barrier filtration system positioned, for example, on the sides of the nacelle.

A number of implementations have been described. Nevertheless, it will be understood that various modifications may be made without departing from the spirit and scope of the disclosure.

The invention claimed is:

1. An aircraft engine barrier filtration system comprising: an engine barrier filter layer positioned near an aircraft engine intake, the filter layer to filter aircraft engine intake air; and a passive one-way check valve assembly positioned adjacent to the engine barrier filter layer, the passive one-way check valve assembly to permit the engine intake air to flow into the engine in a first flow direction through the filter layer during a first aircraft operation mode and to substantially prevent air flow away from the engine in a second flow direction through the filter layer opposite the first flow direction during a second aircraft operation mode that is different from the first aircraft operation mode; wherein the check valve assembly comprises a system of reed valves; with: a first layer comprising a plurality of openings; and a second layer attached to the first layer, the second layer comprising a plurality of reeds, each reed aligned with a corresponding opening of the plurality of openings.

2. The system of claim 1, wherein the check valve assembly is positioned between the aircraft engine and the filter layer.

3. The system of claim 1, wherein the first aircraft operation mode is either a hover mode or an idling mode, or a flight mode with contaminated air, and wherein the second aircraft operation mode is a flight mode with clean air.

4. The system of claim 1, wherein the second layer is formed from a flexible material or a rigid material that is hinged.

5. The system of claim 1, wherein the plurality of openings and the plurality of reeds are rectangular.

6. The system of claim 1, wherein the filter layer is positioned between the aircraft engine and the check valve assembly with a spacer that permits the reed valves to open or close.

7. The system of claim 6, wherein the check valve assembly is arranged in corrugated layers that permit the reed valves to open or close.

8. The system of claim 1, wherein the check valve assembly covers less than an entirety of the filter layer.

9. An aircraft engine barrier filtration and check valve system comprising: an engine barrier filter layer positioned near an aircraft engine intake, the filter layer to filter aircraft engine intake air; and a passive one-way check valve assembly attached to the engine barrier filter layer, the check valve assembly to either permit the engine intake air to flow into the engine through the filter or to substantially prevent air flow away from the engine through the filter based, in part, on an aircraft operation mode; wherein the check valve assembly comprises: a first layer comprising a plurality of openings; and a second layer attached to the first layer, the second layer comprising a plurality of reeds, each reed aligning with a corresponding opening of the plurality of openings.

10. The system of claim 9, wherein the check valve assembly is configured to permit the engine intake air to flow into the engine when the aircraft operation mode is either a hover mode or an idling mode that requires filtered air for the engine.

11. The system of claim 9, wherein the check valve assembly is configured to prevent air flow away from the engine when the aircraft operation mode is a flight mode that does not require filtered air for the engine.

12. The system of claim 11, wherein the aircraft operation mode is a mode in which the aircraft requires filtered air or a mode in which the aircraft does not require filtered air.

13. The system of claim 9, wherein the filter layer is positioned between the aircraft engine and the check valve assembly.

14. The system of claim 9, wherein the check valve assembly is positioned between the aircraft engine and the filter layer.

15. A method of providing intake air to an aircraft engine, the method comprising: permitting flow of aircraft engine intake air in a first direction into an aircraft engine through a passive one-way check valve assembly and through an engine harrier filter layer during a first aircraft operation mode; and preventing, with the passive one-way check valve assembly, flow of air in a second, opposite direction away from the engine through the passive one-way check valve assembly and the engine barrier filter layer during a second aircraft operation mode that is different from the first aircraft operation mode wherein the passive one-way check valve assembly comprises a system of reed valves with: a second layer attached to the first laver, the second layer comprising plurality of reeds, each reed aligning with a corresponding opening of the plurality of openings.

16. The method of claim 15, wherein the first aircraft operation mode is either a hover mode or an idling mode, and wherein the second aircraft operation mode is a flight mode.

17. The method of claim 15, wherein the first aircraft operation mode is an operation mode in which the aircraft requires filtered air and the second aircraft operation mode is an operation mode in which the aircraft does not required filtered air.

18. The method of claim 15, wherein the one-way check valve is positioned adjacent to the engine barrier filter layer.

* * * * *